US010891042B2

(12) United States Patent
Brasseur et al.

(10) Patent No.: US 10,891,042 B2
(45) Date of Patent: Jan. 12, 2021

(54) ADAPTIVE GRAPHICAL USER INTERFACE FOR APPLIANCE

(71) Applicant: Electrolux Appliances Aktiebolag, Stockholm (SE)

(72) Inventors: Jérôme Brasseur, Stockholm (SE); Petter Karlsson, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 16/541,492

(22) Filed: Aug. 15, 2019

(65) Prior Publication Data

US 2019/0369853 A1 Dec. 5, 2019

Related U.S. Application Data

(63) Continuation of application No. 15/509,045, filed as application No. PCT/EP2015/071806 on Sep. 23, 2015, now Pat. No. 10,705,704.

(30) Foreign Application Priority Data

Oct. 24, 2014 (EP) .................................... 14190187

(51) Int. Cl.
*G06F 3/048* (2013.01)
*G06F 3/0484* (2013.01)
(Continued)

(52) U.S. Cl.
CPC ...... *G06F 3/04847* (2013.01); *A47L 15/4293* (2013.01); *D06F 34/28* (2020.02);
(Continued)

(58) Field of Classification Search
None
See application file for complete search history.

(56) References Cited

U.S. PATENT DOCUMENTS

2005/0253807 A1* 11/2005 Hohmann ............... G06F 3/043
345/156
2008/0001928 A1* 1/2008 Yoshida ................. G06F 3/147
345/173
(Continued)

FOREIGN PATENT DOCUMENTS

| CN | 102929511 | 2/2013 |
| CN | 103547987 | 1/2014 |
| WO | 2014/097553 A1 | 1/2017 |

OTHER PUBLICATIONS

Chinese Office action for application No. 201580052823.1 dated Nov. 15, 2019, 8 pages.
(Continued)

*Primary Examiner* — Justin S Lee
(74) *Attorney, Agent, or Firm* — Pearne & Gordon LLP

(57) ABSTRACT

A user interface includes a touch-sensitive display and a display control unit for controlling the display. A method for controlling a household appliance using the graphical user interface includes the steps of: displaying a first graphical representation on the display, the first graphical representation including symbols, each symbol being associated with an appliance subunit of the household appliance; when a symbol is touched by a touching means, transmitting control signals from the control unit to the display to change the first graphical representation into a second graphical representation; displaying information regarding a change of a setting value of the appliance entity associated with the touched symbol when the touching means is dragged from a first position to a second position at the display; and changing the graphical representation at the display from the second graphical representation to a third graphical representation when lifting the touching means from the display.

12 Claims, 2 Drawing Sheets

(51) Int. Cl.
   *F24C 7/08* (2006.01)
   *G06F 3/0488* (2013.01)
   *D06F 34/28* (2020.01)
   *D06F 58/30* (2020.01)
   *A47L 15/42* (2006.01)
   *G06F 3/0486* (2013.01)
   *D06F 101/00* (2020.01)
   *D06F 105/28* (2020.01)

(52) U.S. Cl.
   CPC ............. *D06F 58/30* (2020.02); *F24C 7/086* (2013.01); *G06F 3/0486* (2013.01); *G06F 3/0488* (2013.01); *A47L 2301/00* (2013.01); *D06F 2101/00* (2020.02); *D06F 2105/28* (2020.02)

(56) References Cited

U.S. PATENT DOCUMENTS

| | | | | |
|---|---|---|---|---|
| 2008/0094077 A1* | 4/2008 | Philipp | ............... | G06F 3/04847 324/686 |
| 2009/0140056 A1* | 6/2009 | Leen | ............... | G05B 13/02 236/49.3 |
| 2009/0271369 A1* | 10/2009 | Cheng | ............... | G06F 16/954 |
| 2010/0045621 A1* | 2/2010 | Kang | ............... | G06F 1/1643 345/173 |
| 2010/0199854 A1* | 8/2010 | Homme | ............... | F24C 14/00 99/325 |
| 2011/0016390 A1* | 1/2011 | Oh | ............... | G06F 3/0486 715/702 |
| 2012/0144330 A1* | 6/2012 | Flint | ............... | G06F 3/04847 715/765 |
| 2012/0297342 A1* | 11/2012 | Jang | ............... | G06F 3/04817 715/823 |
| 2013/0038526 A1* | 2/2013 | Flesch | ............... | G06F 3/04886 345/156 |
| 2013/0076642 A1* | 3/2013 | Rampson | ............... | G06F 3/04883 345/173 |
| 2013/0175259 A1* | 7/2013 | Brosnan | ............... | H05B 6/062 219/621 |
| 2013/0196293 A1* | 8/2013 | Wood | ............... | G09B 5/06 434/169 |
| 2013/0249847 A1* | 9/2013 | Goss | ............... | F24C 15/00 345/173 |
| 2013/0346923 A1* | 12/2013 | Ku | ............... | G06F 3/04842 715/835 |
| 2014/0375585 A1* | 12/2014 | Kirkpatrick | ............... | G06F 3/0488 345/173 |
| 2015/0062015 A1* | 3/2015 | Yamanaka | ............... | G06F 3/04886 345/168 |
| 2015/0068408 A1* | 3/2015 | Nagae | ............... | F24C 7/08 99/332 |
| 2015/0135132 A1* | 5/2015 | Josephson | ............... | G06F 3/04842 715/784 |
| 2015/0355805 A1* | 12/2015 | Chandler | ............... | G06F 3/04842 715/784 |
| 2016/0018127 A1* | 1/2016 | Gourlay | ............... | G06F 3/04883 700/278 |
| 2016/0092050 A1* | 3/2016 | Dos Santos | ............... | G06F 3/0482 715/822 |
| 2016/0253080 A1* | 9/2016 | Ban | ............... | G06F 3/04883 715/771 |
| 2017/0139556 A1* | 5/2017 | Josephson | ............... | G06F 3/04847 |

OTHER PUBLICATIONS

Franç Ois Guimbret, et al.; "Benefits of Merging Command Selection and Direct Manipulation", hhttp://www.cs.umd.edu/~francois/Papers/ToCHIMerging.pdf; Dated Sep. 1, 2005; pp. 460-476.

Guimbretiere F., et al.; "FlowMenu: Combining Command, Text, and Data Entry"; Proceedings of the 2000 ACM SIGCPR Conference; Chicago, IL; Apr. 6-8, 2000; pp. 2013-216.

International Search Report and Written Opinion from Corresponding Application No. PCT/EP2015/071806; dated Nov. 26, 2015.

"Keyboard Shortcuts for iPhone and iPad [update for iOS 7]". Amit Agarwal. Oct. 4, 2013. https://www.labnol.org/software/keyboard-typing-shortcuts-for-iphone-ipad/13564/. Retrieved Jan. 10, 2019. 10 pages.

EP OA for application No. 14190187.6, dated Aug. 12, 2019, 9 pages.

* cited by examiner

ADAPTIVE GRAPHICAL USER INTERFACE FOR APPLIANCE

This application is a continuation of U.S. application Ser. No. 15/509,045, filed on Mar. 6, 2017, which claims the benefit of PCT application no. PCT/EP2015/071806 filed on Sep. 23, 2015 and EP application no. 14190187.6 filed on Oct. 24, 2014. These applications are incorporated herein by reference.

Generally, the present invention relates to the field of graphical user interfaces. More specifically, the present invention relates to a graphical user interface comprising a touch-sensitive display for controlling a household appliance.

BACKGROUND OF THE INVENTION

Graphical user interfaces comprising a touch-sensitive display are known in prior art. Specifically, household appliances, for example hobs have been presented which show a touch-sensitive display for controlling the operation of the household appliance. A user interaction at the graphical user interface allows modifying a plurality of settings of the household appliance, for example the power provided to the appliance or an appliance subunit.

A major disadvantage of known graphical user interfaces is that said touch-sensitive displays suffer from insufficient user friendliness and low intuitive operability.

SUMMARY OF THE INVENTION

It is an objective of the embodiments of the invention to provide a graphical user interface with an improved and user-friendly operability. The objective is solved by the features of the independent claims. Preferred embodiments are given in the dependent claims. If not explicitly indicated otherwise, embodiments of the invention can be freely combined with each other.

According to an aspect, a method for controlling a household appliance using a graphical user interface is disclosed. The user interface comprises a touch-sensitive display and a display control unit for controlling the touch-sensitive display. Said touch-sensitive display may be any kind of touchscreen, for example, resistive, capacitive or inductive touchscreen. The display control unit might be included in the touchscreen or a separate control unit being coupled with the touch-sensitive display. The method for controlling the household appliance comprises the steps of:

displaying a first graphical representation on the touch-sensitive display, the first graphical representation comprising one or more symbols, each symbol associated with an appliance subunit of the household appliance;

when a symbol is touched and preferably keep touched by a touching means, transmitting control signals from the display control unit to the touch-sensitive display in order to change the first graphical representation into a second graphical representation;

displaying information regarding a change of a setting value of the appliance entity associated with the touched symbol when said touching means is dragged from a first position to a second position at the touch-sensitive display while keeping the touch-sensitive display touched; and changing the graphical representation on the touch-sensitive display from the second graphical representation to a third graphical representation when lifting the touching means from the touch-sensitive display.

Said method is advantageous because a setting associated with an appliance subunit of the household appliance can be changed with a single drag user interaction on the touch-sensitive display in an intuitive and user-friendly way. Multiple touches at different locations of the touch-sensitive display are avoided.

According to embodiments, the changed setting value associated with the second position is forwarded to an appliance control unit when the finger is lifted. The appliance control unit may perform the power control of different appliance subunits, for example, heating elements of the hob. The appliance control unit may change the power or any other setting of the appliance subunit based on the setting value received by the display control unit.

According to embodiments, the first and third graphical representation comprises a plurality of symbols and the second graphical representation comprises fewer symbols than the first and third graphical representation or only the single symbol which has been touched by the user in order to change the setting value.

According to embodiments, a value range indication is displayed in the second graphical representation in order to indicate which position on the touch-sensitive display is associated with a certain setting value. In addition, the touched symbol may also comprise information regarding the setting value correlated with the actual position of the touching means. Based on the value range indication, the user gets information which position to choose in order to obtain a desired setting value. In addition, the value range indication might indicate the dragging direction of the touching means.

According to embodiments, after lifting the touching means at the second position, the graphical representation on the touch-sensitive display is changed into the third graphical representation which essentially corresponds to the first graphical representation. In other words, after lifting the touching means, the value range indication may be removed. The third graphical representation may display the chosen setting value in correlation with the symbol in order to inform the user which setting value has been chosen for the corresponding appliance subunit.

According to a second aspect, a graphical user interface for controlling household appliances is disclosed. The graphical user interface comprises a touch-sensitive display and a display control unit for controlling the touch-sensitive display. The touch-sensitive display is adapted for displaying one or more symbols associated with an appliance entity of the household appliance in a first graphical representation. The display control unit is configured to change the first graphical representation displayed by the touch-sensitive display to a second graphical representation when a symbol is touched by touching means, for example, a finger of a user. Furthermore, the touch-sensitive display is configured to display information regarding a change of a setting value of the appliance entity associated with the touched symbol when the touching means is dragged from a first position to a second position at the touch-sensitive display and the display control unit is configured to change the second graphical representation to a third graphical representation after the touching means has been lifted.

According to an embodiment of the graphical user interface, the display control unit is adapted to forward the changed setting value associated with the second position to an appliance control unit when the touching means is lifted.

According to an embodiment of the graphical user interface, the touched symbol keeps displayed at the first position when dragging the touching means.

According to an embodiment of the graphical user interface, the display control unit is adapted to drive the touch-sensitive display such that the same number of symbols are displayed in the first and third graphical representation and a reduced number of symbols or only the single touched symbol are displayed in the second graphical representation.

According to an embodiment of the graphical user interface, the display control unit is adapted to drive the touch-sensitive display such that a value range is displayed in the second graphical representation in order to indicate which position at the touch-sensitive display is associated with a certain setting value.

According to an embodiment of the graphical user interface, the display control unit is adapted to drive the touch-sensitive display such that after lifting the touching means at the second position, the chosen setting value of the appliance entity associated with the touched symbol is displayed for a limited period of time (e.g. 10 s-60 s) in association with the touched symbol.

According to a third aspect, a household appliance comprising a graphical user interface is disclosed. The graphical user interface is configured according to the embodiments described above.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
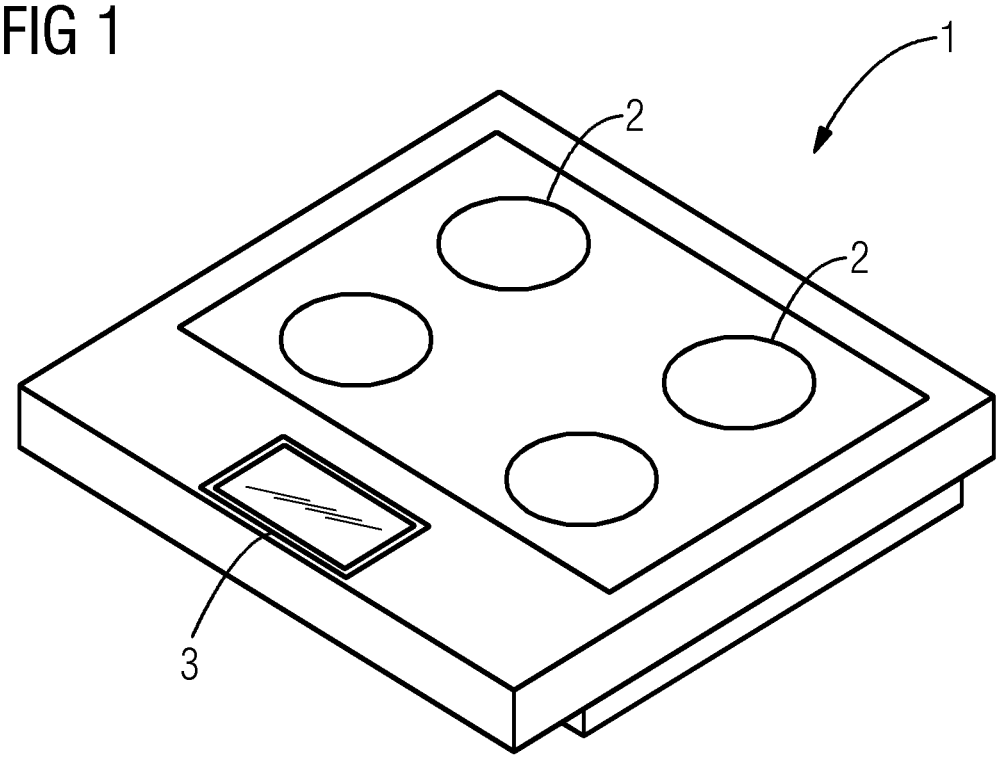
FIG. 1 shows an example schematic view of a hob comprising a graphical user interface.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic diagram of a hob 1 comprising a plurality heating zones 2. The hob 1 may be, for example, an induction hob. It is worth mentioning, that the invention is not limited to hobs but also refers to other household appliances, for example, dish washers, baking ovens, washing machines, dryers etc. Each heating zone may comprise one or more heating elements, for example, induction coils or heating coils for electrical resistance heating.

In order to control the heating zones 2, the hob 1 comprises a user interface formed by a touch-sensitive display 3. The touch-sensitive display 3 is configured to receive a command to drive heating zones 2 from a user and to display information related to an operation of the hob 1. In general, the touch-sensitive display 3 forms an input and display unit, thereby simultaneously serving as the input unit and the display unit. That is, a user receives a current operation state of the hob 1 through various types of information displayed on the touch-sensitive display 3. In addition, a user makes contact with the touch-sensitive display 3, thereby generating a control command for controlling the hob 1, e.g. increasing or decreasing the heating power of one or more heating elements.

Figure 2:
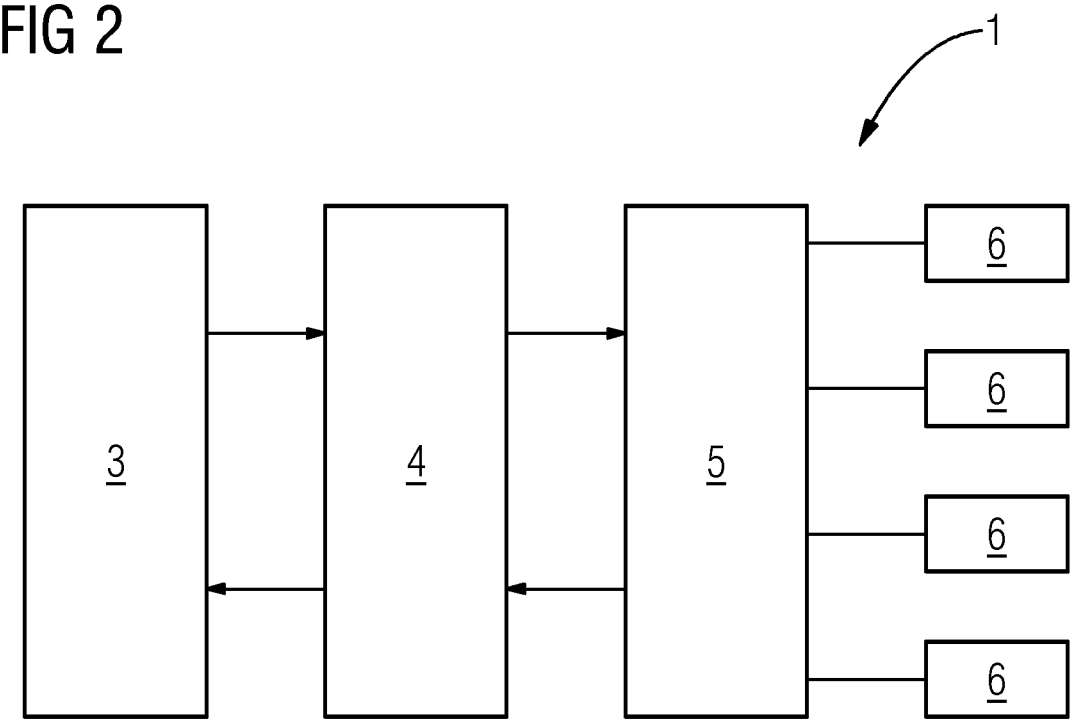
FIG. 2 shows an example block diagram of a hob.

FIG. 2 shows an example schematic structure of the hob 1 by means of a block diagram. The touch-sensitive display 3 is coupled with a display control unit 4 which is adapted to control touch-sensitive display 3. Specifically, the display control unit 4 determines the location at which a user touches the display 3 and interprets the intended user command based on the symbols displayed on the screen and the location of the touch. Furthermore, the display control unit 4 controls the symbols and illustrations displayed at the touch-sensitive display 3, for example the arrangement of symbols, the size of the symbols and other display settings, for example display brightness. The display control unit 4 may be integrated in the control touch-sensitive display 3 or may be a discrete unit within the hob 1.

The display control unit 4 may be coupled with a hob control unit 5 which is configured for controlling the hob 1. For example, the hob control unit 5 may control the power provided to the heating elements, realize a timer function for driving one or more heating elements for a certain period of time, etc. The hob control unit 5 may be coupled with the heating elements 6 for providing electrical power to said heating elements 6 according to the settings entered at the touch-sensitive display 3. The coupling between the hob control unit 5 and the heating elements 6 may be a direct coupling or an indirect coupling via an electrical power unit or an inverter unit (in case that the heating elements 6 are induction coils).

Figure 3A:
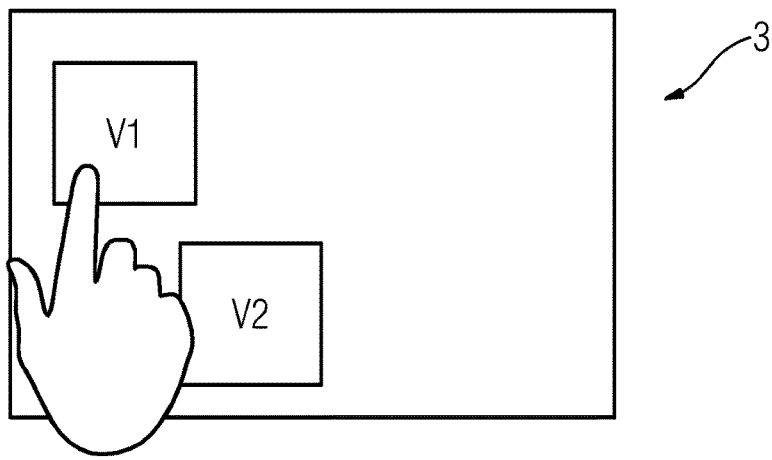
FIG. 3a-3c shows an example drag-and-drop user interaction at the graphical user interface of the hob.
Figure 3B:
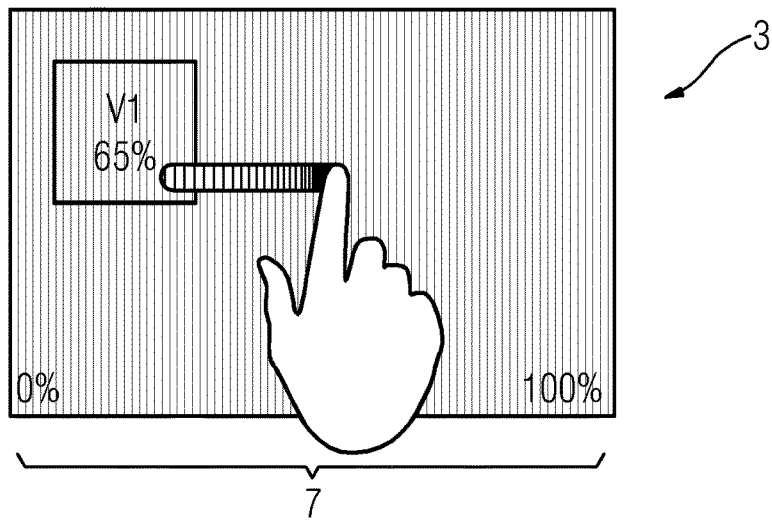
Figure 3C:
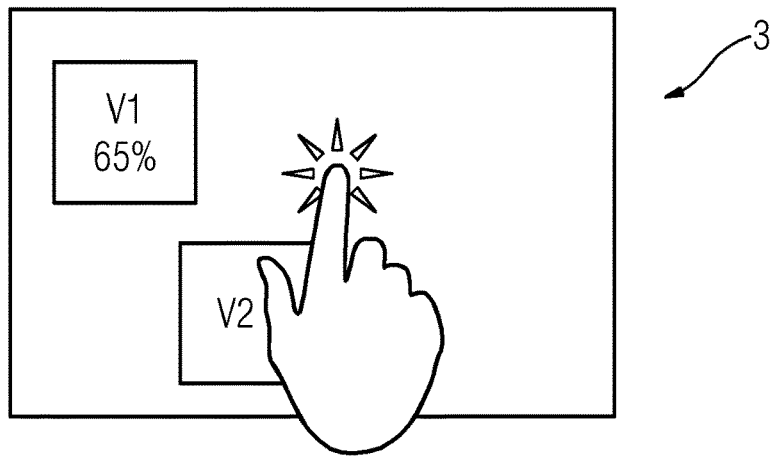

FIG. 3a-3c show an example gesture control of the hob 1 by a sequence of illustrations sequentially displayed at the touch-sensitive display 3. The shown example is used for controlling the power of a heating zone 2 of the hob 1. Of course, said gesture control may also be used for other control tasks, for example controlling a timer function etc.

FIG. 3a shows a first graphical representation at the touch-sensitive display 3 at the beginning of a gesture control. The touch-sensitive display 3 shows, for example, two symbols V1 and V2, wherein each symbol may be associated with a respective heating zone 2. The position of the symbols on the touch-sensitive display 3 may be correlated with the position of the respective heating zone 2 at the cocking surface of the hob 1. It is worth mentioning that the position of said symbols V1 and V2 in FIG. 3a is not correlated with any operational properties, for example the power provided to the respective heating zone correlated with the symbol.

If a user touches the touch-sensitive display 3 (by appropriate touching means, e.g. a finger or elbow) in the area at which the respective symbol V1, V2 is located, the display control unit 4 may receive information regarding the position of the touch. The display control unit 4 also has knowledge which symbol is located at the touched position. For example, the display control unit 4 comprises a memory unit for storing information regarding which symbol is located at which position/area of the touch-sensitive display 3. Thus, the display control unit 4 is able to correlate the touched position with a displayed symbol (in the present example, symbol V1).

When keep touching the symbol, the graphical representation displayed at the touch-sensitive display 3 may change into a second graphical representation displaying a control setting information (FIG. 3b). For example, information regarding an operational property may be displayed in association with the touched symbol. In the present embodiment, power level information may be displayed. In other embodiments, other setting values, in the following also referred to as operational properties, may be displayed, for example a time span indicating the period of time keeping the heating zone correlated with the symbol powered on etc.

While keeping the symbol touched, the user may change the operational property by dragging the touching means along the touch-sensitive display 3. More in detail, the user may move the touching means from a first position to a second position different to the first one. The display control unit 4 may receive information regarding the movement of the touch position and may process operational property change information in order to display a changed operational property value at the display 3. The value change may depend on the distance between the first and second position. For example, in case that the touching means is only moved along a short distance, the value change may be small whereas the value change may be higher when the symbol is moved along a greater distance.

As shown in FIG. 3b, a value range indication 7 may be displayed on the touch-sensitive display 3. Said value range indication 7 may provide information regarding which position on the touch-sensitive display 3 is associated with a respective operational property value. In addition, the value range indication 7 may be indicative for the direction along which the symbol has to be moved in order to change the operational property value.

Furthermore, when changing the graphical representation for displaying control setting information, the number of symbols displayed at the touch-sensitive display 3 may be reduced in order to provide display space for dragging the touching means without any symbol collision. For example, the second graphical representation for displaying control setting information may only show the touched symbol, i.e. all other symbols are hidden. According to another example embodiment, in the second graphical representation only those symbols may be hidden which are arranged in an area of the display 3 in which the touching means has to be dragged in order to change the operational property value.

When dragging the touching means along the touch-sensitive display 3, the displayed value of the operational property may be immediately updated. Thereby the user is able to choose the desired value by moving the symbol along the touch-sensitive display 3. The display control unit 4 may process the dragging position of the touching means and update the displayed operational property value according to the distance along which the touching means has been moved.

After the desired operational property value is reached by upper-mentioned dragging of the touching means, the user may lift the touching means thereby stop touching the touch-sensitive display (FIG. 3c). Thereby, the operational property value associated with the lift position may be taken over and transmitted to the hob control unit 5 in order to operate the respective heating zone 2 according to said operational property value. More in detail, the operational property value associated with the lift position may be transmitted to the hob control unit 5 and stored in a memory unit. The hob control unit 5 may adapt the operation of the respective heating zone 2 according to the received value.

After said lifting, the graphical representation at the touch-sensitive display 3 may change to a third graphical representation. Said third graphical representation may be identical or similar to the first graphical representation displayed at the beginning of the gesture control operation. Specifically, the symbols which have been removed in the second graphical representation may be displayed again. In addition, the value range indication 7 may be removed. According to preferred embodiments, the chosen operational property value may be displayed for a certain period of time in association with the touched symbol in order to provide information regarding the chosen value to the user.

The described gesture control method is advantageous because the household appliance can be controlled in a simple and user-friendly way by a single gesture, i.e. by a single drag operation.

Above, embodiments of user interface according to the present invention as defined in the appended claims have been described. These should be seen as merely non-limiting examples. As understood by a skilled person, many modifications and alternative embodiments are possible within the scope of the invention.

LIST OF REFERENCE NUMERALS

1 hob
2 heating zone
3 touch-sensitive display
4 display control unit
5 hob control unit
6 heating element
7 value range indication
V1, V2 symbol

What is claimed is:

1. A method for controlling a household appliance using a graphical user interface, the user interface comprising a touch-sensitive display and a display control unit for controlling the touch-sensitive display, the method comprising the steps of:

displaying a first graphical representation on the touch-sensitive display, the first graphical representation comprising one or more symbols, each symbol representing an appliance subunit of the appliance subunit of the household appliance;

when one of the symbols is selected based on a touch at the one of the symbols by a touching means, changing the first graphical representation into a second graphical representation, the second graphical representation comprising a value range indication that allows the user to change a power setting value of the appliance subunit represented by the selected symbol by a dragging that begins from a starting point within an area of the selected symbol and proceeds across the second graphical representation, wherein the value range indication displays the power setting value in the area of the selected symbol fixed at a position as the dragging proceeds, the power setting value being changed in proportion to a dragging distance from the starting position within the area of the selected symbol; and when the touching means is lifted from the touch-sensitive display, changing the second graphical representation to a third graphical representation, the third graphical representation comprising a display of the changed power setting value selected by the dragging across the second graphical representation.

2. The method of claim 1 wherein the appliance includes a cooking hob.

3. The method of claim 1 wherein the appliance subunit is a heating element.

4. The method of claim 3 wherein the power setting value corresponds with power applied to one or more heating elements.

5. The method of claim 4 wherein a heating zone comprises the one or more heating elements.

6. The method of claim 5 wherein a position of the one of the symbols on the touch-sensitive display correlates with a position of the heating zone on a surface of a cooking hob.

7. The method of claim 5 wherein the power setting value corresponds with power applied to heating elements in a heating zone comprising more than one heating element.

8. The method of claim 1 wherein the value range indication indicates a dragging direction for changing the power setting value.

9. The method of claim 1 wherein the displayed power setting value is immediately updated during the dragging.

10. The method of claim 1, wherein symbol representing an appliance subunit allows directly effecting change of the power setting value of the appliance subunit of the household appliance.

11. A method for controlling a cooking hob using a graphical user interface, the cooking hob comprising a heating zone including a heating element the user interface comprising a touch-sensitive display and a display control unit for controlling the touch-sensitive display, the method comprising the steps of:
  displaying a first graphical representation on the touch-sensitive display, the first graphical representation comprising one or more symbols, each symbol representing the heating zone;
  when one of the symbols is selected based on a touch at the one of the symbols by a touching means, changing the first graphical representation into a second graphical representation, the second graphical representation comprising a value range indication that allows the user to change a power setting value of power applied to the heating element of the heating zone represented by the selected symbol by a dragging that begins from a starting point within an area of the selected symbol and proceeds across the second graphical representation, wherein the value range indication displays the power setting value in the area of in the selected symbol fixed at a position as the dragging proceeds for changing the power setting value in proportion to a dragging distance from the starting position within the area of the selected symbol, wherein the displayed power setting value is immediately updated during the dragging; and
  when the touching means is lifted from the touch-sensitive display, changing the second graphical representation to a third graphical representation, the third graphical representation comprising a display of the changed power setting value selected by the dragging across the second graphical representation.

12. A cooking hob comprising one or more subunits, each subunit comprising one or more heating elements, a touch-sensitive display, a display control unit to control the touch-sensitive display, an appliance control unit to control the heating elements, wherein the touch-sensitive display is configured to:
  display a first graphical representation on the touch-sensitive display, the first graphical representation comprising one or more symbols, each symbol representing the subunit of the hob, wherein a position of one of the symbols on the touch-sensitive display correlates with a position of the heating zone on a surface of the hob;
  change the first graphical representation into a second graphical representation, when the one of the symbols is selected based on a touch at the one of the symbols by a touching means, the second graphical representation comprising a value range indication that allows the user to change a power setting value of the subunit represented by the selected symbol by a dragging that begins from a starting point within an area of the selected symbol and proceeds across the second graphical representation, the value range indication displays the power setting value in the area of the selected symbol as the dragging proceeds for changing the power setting value in proportion to a dragging distance from the starting position within the area of the selected symbol, wherein the power setting value corresponds to power applied to the one or more heating elements of the subunit and the displayed power setting value is immediately updated during the dragging; and
  change the second graphical representation to a third graphical representation when the touching means is lifted from the touch-sensitive display, the third graphical representation comprising a display of the changed power setting value selected by the dragging across the second graphical representation.

* * * * *